(12) United States Patent
Kamisono et al.

(10) Patent No.: US 10,800,032 B2
(45) Date of Patent: Oct. 13, 2020

(54) INDUSTRIAL ROBOT, CONTROLLER, AND METHOD THEREOF

(71) Applicant: OMRON Corporation, Kyoto (JP)

(72) Inventors: Daichi Kamisono, Kusatsu (JP); Yoshiharu Tani, Kusatsu (JP); Kazunori Osako, Otsu (JP); Toshiyuki Higuchi, Kusatsu (JP); Minoru Hashimoto, Ritto (JP); Masaki Fujita, Ritto (JP)

(73) Assignee: OMRON Corporation, Kyoto (JP)

( * ) Notice: Subject to any disclaimer, the term of this patent is extended or adjusted under 35 U.S.C. 154(b) by 365 days.

(21) Appl. No.: 15/891,342

(22) Filed: Feb. 7, 2018

(65) Prior Publication Data
US 2018/0311814 A1 Nov. 1, 2018

(30) Foreign Application Priority Data
Apr. 28, 2017 (JP) ................... 2017-090131

(51) Int. Cl.
*B25J 9/00* (2006.01)
*G06F 3/01* (2006.01)
(Continued)

(52) U.S. Cl.
CPC ........... *B25J 9/0081* (2013.01); *B25J 9/1656* (2013.01); *B25J 9/1664* (2013.01); *B25J 9/1694* (2013.01); *B25J 13/081* (2013.01); *B25J 13/086* (2013.01); *G05B 19/423* (2013.01); *G06F 3/017* (2013.01); *G05B 2219/36418* (2013.01); *G05B 2219/37284* (2013.01); *G05B 2219/40544* (2013.01); *G05B 2219/40627* (2013.01); *G06F 3/044* (2013.01); *G06F 2203/04101* (2013.01); *Y10S 901/04* (2013.01); *Y10S 901/15* (2013.01); *Y10S 901/46* (2013.01)

(58) Field of Classification Search
CPC ...... B25J 9/1664; B25J 13/081; B25J 13/086; B25J 13/084; B25J 13/085; G05B 2219/40544; G05B 2219/37284; G05B 2219/40627; G05B 2219/36418; Y10S 901/15; Y10S 901/04; Y10S 901/46; G06F 3/044; G06F 2203/04101
See application file for complete search history.

(56) References Cited

U.S. PATENT DOCUMENTS

| | | | |
|---|---|---|---|
| 8,958,912 B2 * | 2/2015 | Blumberg | B25J 9/0087 700/259 |
| 2016/0184032 A1 * | 6/2016 | Romo | A61B 34/30 606/130 |
| 2016/0291697 A1 * | 10/2016 | Jules | G06F 21/31 |

FOREIGN PATENT DOCUMENTS

| | | |
|---|---|---|
| CN | 106203299 | 12/2016 |
| DE | 102008062622 | 6/2010 |

(Continued)

OTHER PUBLICATIONS

"Search Report of Europe Counterpart Application", dated Oct. 24, 2018, p. 1-p. 11.

*Primary Examiner* — Bao Long T Nguyen
(74) *Attorney, Agent, or Firm* — JCIPRNET

(57) ABSTRACT

An industrial robot having high operability for a user is provided. An industrial robot includes a manipulator, a controller which controls an operation of the manipulator, and a detection device attached to the manipulator and detecting a gesture input. The controller executes a process corresponding to the detected gesture input.

17 Claims, 10 Drawing Sheets

(51) Int. Cl.
 *B25J 9/16* (2006.01)
 *B25J 13/08* (2006.01)
 *G05B 19/423* (2006.01)
 *G06F 3/044* (2006.01)

(56) References Cited

FOREIGN PATENT DOCUMENTS

| | | | |
|---|---|---|---|
| DE | 102015012959 | 4/2017 | |
| DE | 102015012959 A1 * | 4/2017 | ............ B25J 13/081 |
| EP | 2864085 | 11/2016 | |
| JP | 2005161450 | 6/2005 | |
| JP | 2005161450 A * | 6/2005 | |
| JP | 2014184541 | 10/2014 | |
| JP | 2015182142 | 10/2015 | |
| JP | 2015182142 A * | 10/2015 | ........... G05B 19/423 |
| WO | 2016161444 | 10/2016 | |
| WO | WO-2016161444 A1 * | 10/2016 | ............ A61B 34/30 |

* cited by examiner

| Pattern | process | Detected content (gesture) | Details of process |
|---|---|---|---|
| A | Direct teaching operation-1 (storage of teaching point) | (1) sensor input from sensor device 31, 33 | Start direct teaching |
| | | (2) stop sensor input from sensor device 33 (continue sensor input from sensor device 31) | changing process of teaching point |
| | | (3) receive sensor input corresponding to double-tap operation from sensor device 33 with sensor input from sensor device 31 continuing | Storage of teaching point |
| B | Restart robot | Receive sensor input corresponding to double tap operation from sensor device 34 | — |
| C | Return posture of manipulator to default posture (return to its initial point) | Receive sensor input corresponding to swipe operation from sensor device 33 | — |
| D | Switch operation (change in operation mode) | Receive sensor input corresponding to swipe operation from sensor device 33 with sensor input from sensor device 34 continuing | — |
| E | Change auxiliary torque | ... | ... |
| F | Direct teaching operation-2 (storage of movement speed) | ... | ... |
| G | Setting of safety distance | ... | ... |
| H | Transition to normal operation | ... | ... |
| ... | ... | ... | ... |

FIG. 10

INDUSTRIAL ROBOT, CONTROLLER, AND METHOD THEREOF

CROSS-REFERENCE TO RELATED APPLICATION

This application claims the priority benefit of Japanese application serial no. 2017-090131, filed on Apr. 28, 2017. The entirety of the above-mentioned patent application is hereby incorporated by reference herein and made a part of this specification.

BACKGROUND

Technical Field

The disclosure relates to an industrial robot, a controller for controlling the industrial robot, and a method in the controller.

Related Art

Conventionally, various types of industrial robot are known. As such an industrial robot, Japanese Laid-open No. 2015-182142 (Patent Document 1) discloses a robot including a robot main body, an arm provided on the robot main body, a touch panel monitor provided on the arm, and a control unit.

In the robot disclosed in Patent Document 1, when a posture of the arm is changed in accordance with an external force applied to the arm hand and then an input to the touch panel monitor is acquired, the control unit performs direct teaching in which the posture of the arm which has changed is generated as teaching information.

Specifically, when a teacher touches the touch panel monitor, the control unit causes the touch panel monitor to display a menu screen including a new button and an edit button. When a touch input to the new button is performed, the control unit starts the direct teaching. Specifically, the control unit releases a holding brake of each joint shaft of the arm so that the posture can be changed due to an external force. Also, when the posture is changed by an external force and then a touch input to a position storage button displayed on the touch panel monitor is received, the control unit detects the posture and generates teaching information in which the posture and a work number thereof are associated.

In a robot of Patent Document 1, selection of buttons displayed on a touch panel monitor is required a plurality of times at the time of direct teaching. Therefore, it is necessary for the user (teacher) to check the screen display each time and select one button from a plurality of displayed buttons. Therefore, a robot having such a touch panel monitor cannot be said to have high operability for the user.

In addition, Japanese Laid-open No. 2014-184541 (Patent Document 2) is also a related art to the disclosure.

SUMMARY

According to an aspect of the disclosure, an industrial robot includes a manipulator, a controller which controls an operation of the manipulator, and a detection device attached to the manipulator and configured to detect a gesture input. The controller executes a process corresponding to the detected gesture input.

According to another aspect of the disclosure, a controller controls an operation of a manipulator of an industrial robot. The controller includes a determination unit of determining a pattern of a gesture input to the industrial robot on the basis of an output from a detection device attached to the manipulator, and an execution unit of executing a process corresponding to the detected pattern.

According to yet another aspect of the disclosure, a method is executed in a controller which controls an operation of a manipulator of an industrial robot. The method includes a step of determining a pattern of a gesture input to the industrial robot on the basis of an output from a detection device attached to the manipulator, and a step of executing a process corresponding to the detected pattern.

BRIEF DESCRIPTION OF THE DRAWINGS

FIG. 10 is a view showing an overview of data stored in a storage unit.

DESCRIPTION OF THE EMBODIMENTS

Embodiments of the disclosure will be described below with reference to the drawings. In the following description, the same parts are denoted by the same reference signs. Their names and functions are also the same. Therefore, detailed description thereof will not be repeated.

In the following description, a cooperative robot will be taken as an example of an industrial robot. "Cooperative robot" refers to a robot controlled so that a worker and a robot can work in the same region. The cooperative robot collaborates with the worker while ensuring safety of the worker. As work is shared by the work and the robot, efficiency of productivity can be improved.

A. Overall Configuration

Figure 1:
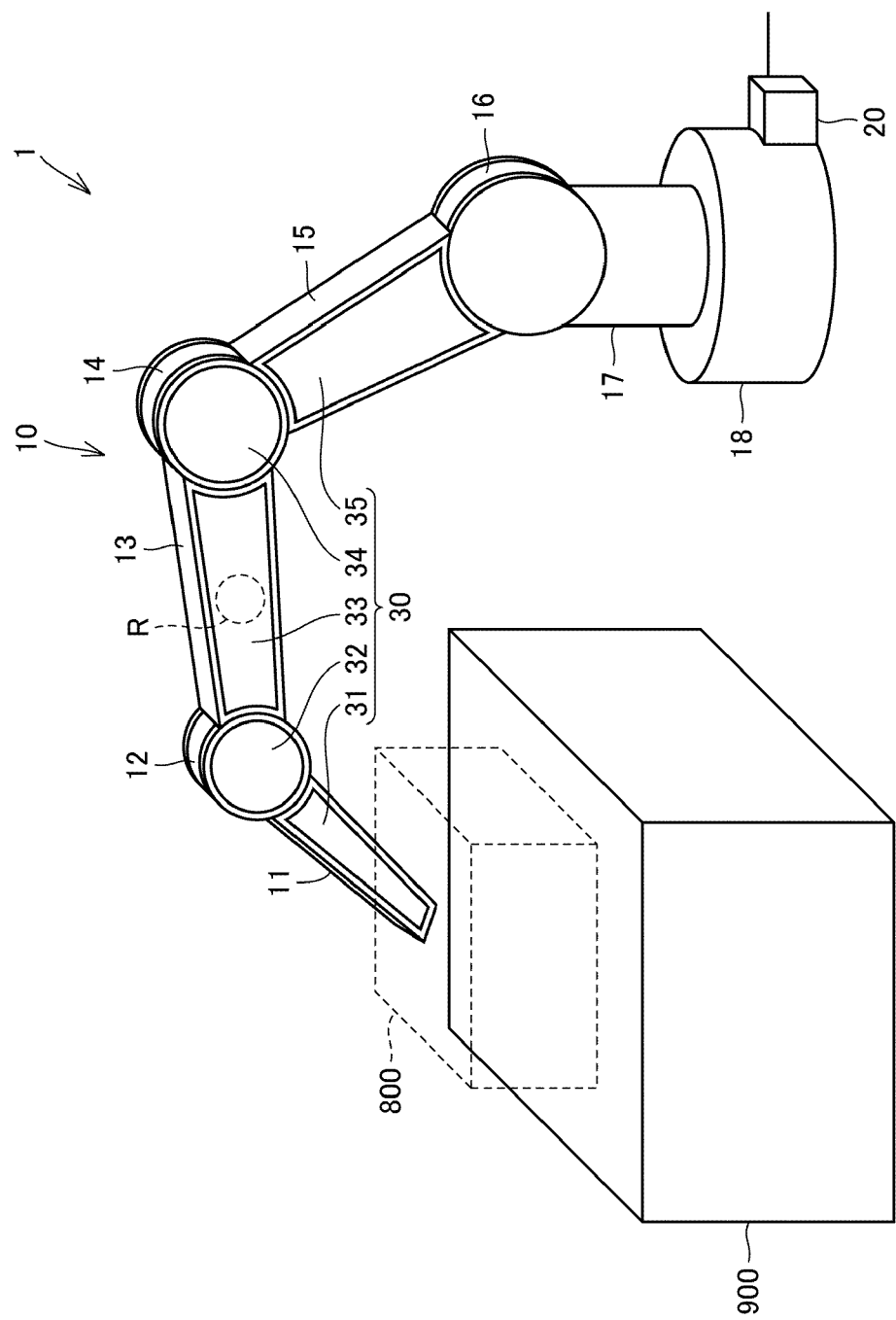
FIG. 1 is a view for describing a schematic configuration of an industrial robot.

FIG. 1 is a view for describing a schematic configuration of an industrial robot 1. Referring to FIG. 1, the industrial robot 1 includes a manipulator 10, a controller 20, and a detection device 30. Also, a region 800 on a workbench 900 is a region in which the worker and the industrial robot 1 work cooperatively.

(1) Manipulator 10

The manipulator 10 includes a plurality of arms 11, 13, and 15, a plurality of joints 12, 14, and 16, a pivot portion 17, and a pedestal portion 18. Specifically, the arm 11, the joint 12, the arm 13, the joint 14, the arm 15, the joint 16, the pivot portion 17, and the pedestal portion 18 are provided in that order from a distal end side in the manipulator 10.

An end-effector (not illustrated) is attached to a distal end portion of the arm 11. A rear end portion of the arm 11 is connected to the joint 12. The joint 12 is attached to a distal end portion of the arm 13. A rear end portion of the arm 13 is connected to the joint 14. A joint 14 is attached to a distal end portion of the arm 15. A rear end portion of the arm 15 is connected to the joint 16.

The joint 12 moves the arm 11 with respect to the arm 13. The joint 14 moves the arm 13 with respect to the arm 15. The joint 16 moves the arm 15 with respect to the pivot portion 17.

The pivot portion 17 is configured to support the joint 16 and be rotatable around a rotation axis (not illustrated) which is parallel to a vertical axis. The pedestal portion 18 rotatably supports the pivot portion 17.

(2) Detection Device 30

The detection device 30 is attached to the manipulator 10 and detects a gesture input by a user. The detection device 30 is used in the present example to measure a distance between the manipulator 10 and an object (for example, a person). In this manner, the detection device 30 detects approach of the user and a gesture input based on a touch operation by the user.

Specifically, the detection device 30 is configured with a plurality of sensor devices 31 to 35. The sensor device 31 is attached to a surface of the arm 11. The sensor device 32 is attached to a surface of the joint 12. The sensor device 33 is attached to a surface of the arm 13. The sensor device 34 is attached to a surface of the joint 14. The sensor device 35 is attached to a surface of the arm 15.

Each of the sensor devices 31 to 35 functions as a safety sensor. Specifically, each of the sensor devices 31 to 35 is configured as a sensor array (see FIG. 2) including a plurality of proximity sensors. Each of the sensor devices 31 to 35 outputs detection results to the controller 20.

In each of the anus 11, 13, and 15, a configuration in which a sensor device is provided on one of four surfaces is described as an example, but the disclosure is not limited thereto. In each of the anus 11, 13, and 15, there may be a configuration in which sensor devices are provided on a plurality of surfaces.

In the joint 12, a sensor device may be provided also on a back surface on which the sensor device 32 is not provided. In the joint 14 as well, a sensor device may be provided also on a back surface on which the sensor device 34 is not provided.

(3) Controller 20

The controller 20 controls an operation of the manipulator 10. Specifically, the controller 20 controls rotating operations of the plurality of joints 12, 14, and 16, and the pivot portion 17. Further, the controller 20 may be provided separately from the industrial robot 1 in such a manner of being capable of communicating with the industrial robot 1.

The controller 20 identifies which one of the sensor devices 31 to 35 an output obtained is from. Further, the controller 20 executes processes based outputs of these sensor devices 31 to 35. In a certain aspect, the controller 20 executes a process corresponding to a gesture input detected by each of the sensor devices 31 to 35.

Specifically, the controller 20 determines whether or not a gesture input detected by each of the sensor devices 31 to 35 is an input of a predetermined pattern. As the gesture input, an input based on various types of touch operation such as a tap, a double tap, swipe, and the like can be exemplified.

When an input is determined to be the predetermined pattern, the controller 20 executes a process according to the input of the predetermined pattern. Specific examples of the pattern and the process will be described below.

(4) Configuration of Sensor Device

Figure 2:
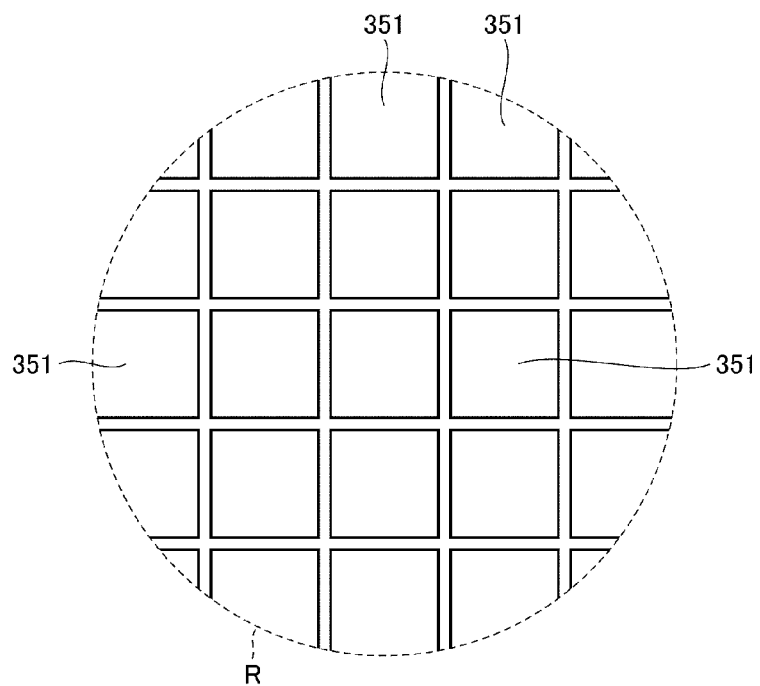
FIG. 2 is an enlarged view of a partial region of a sensor device.

FIG. 2 is an enlarged view of a partial region (region R) of the sensor device 33 illustrated in FIG. 1. As illustrated in FIG. 2, the sensor device 33 is configured as a sensor array including a plurality of proximity sensors 351. Further, the other sensor devices 31, 32, 34, and 35 are also configured as sensor arrays including a plurality of proximity sensors 351. Each of the sensor devices 31 to 35 is configured as, for example, a capacitive type pad.

For example, focusing on the sensor device 33, when a touch operation is performed on the sensor device 33 by the user, a signal based on the touch operation is output to the controller 20 from the touched proximity sensor 351 or the proximity sensors 351 in the vicinity thereof among the proximity sensors 351 configuring the sensor device 33. In this case, the controller 20 acquires a gesture input performed on the sensor device 33 based on the output from each of the proximity sensors 351. Thereafter, the controller 20 determines whether or not the gesture input matches a predetermined pattern.

B. Overview of Process

An example of a gesture input and a process performed based on the gesture input will be described below.

(1) First Example

Figure 3:
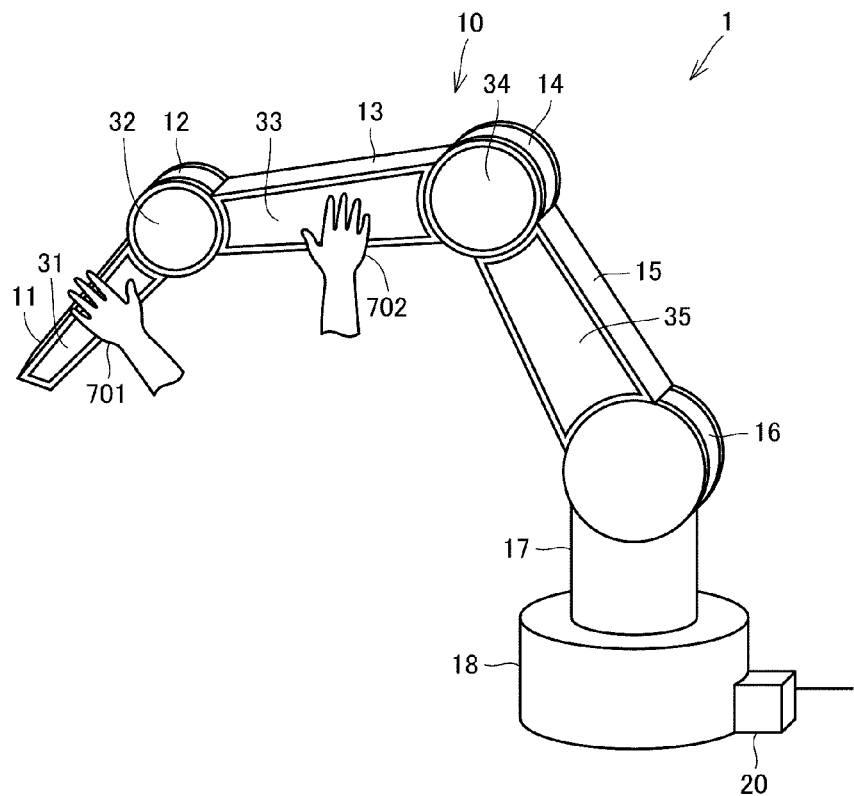
FIG. 3 is a view for describing a first example of a gesture input.

FIG. 3 is a view for describing a first example of a gesture input. As illustrated in FIG. 3, the user touches the sensor device 31 with a left hand 701 and simultaneously touches the sensor device 33 with a right hand 702. As a result, the controller 20 determines that an input for starting direct teaching has been performed, and shifts to a direct teaching mode.

Thereafter, the user separates the right hand 702 from the sensor device 33 and moves the manipulator 10 with the right hand 702 which has been moved away. Further, in a state in which the left hand 701 is touching the sensor device 31, the user performs a double tap on the sensor device 33 with the right hand 702 which has moved the manipulator 10. Thereby, the controller 20 stores a position after the movement as a teaching point.

Further, in the example described above, it has been described that the user separates the right hand 702 from the sensor device 33, but the disclosure is not limited thereto. There may be a configuration in which the left hand 701 is separated from the sensor device 31 and the manipulator 10 is moved by the left hand 701. In this case, in a state in which the right hand 702 is touching the sensor device 33, the user performs a double tap on the sensor device 31 with the left hand 701 which has moved the manipulator 10. Thereby, the controller 20 stores a position after the movement as a teaching point.

Also, a combination of the sensor devices touched by the left hand 701 and the right hand 702 is not limited to the sensor devices 31 and 33. Further, it is also possible to set the sensor device to which the hand which was moved away therefrom touched and the sensor device on which a double tap is performed thereafter are different from each other.

(2) Second Example

Figure 4:
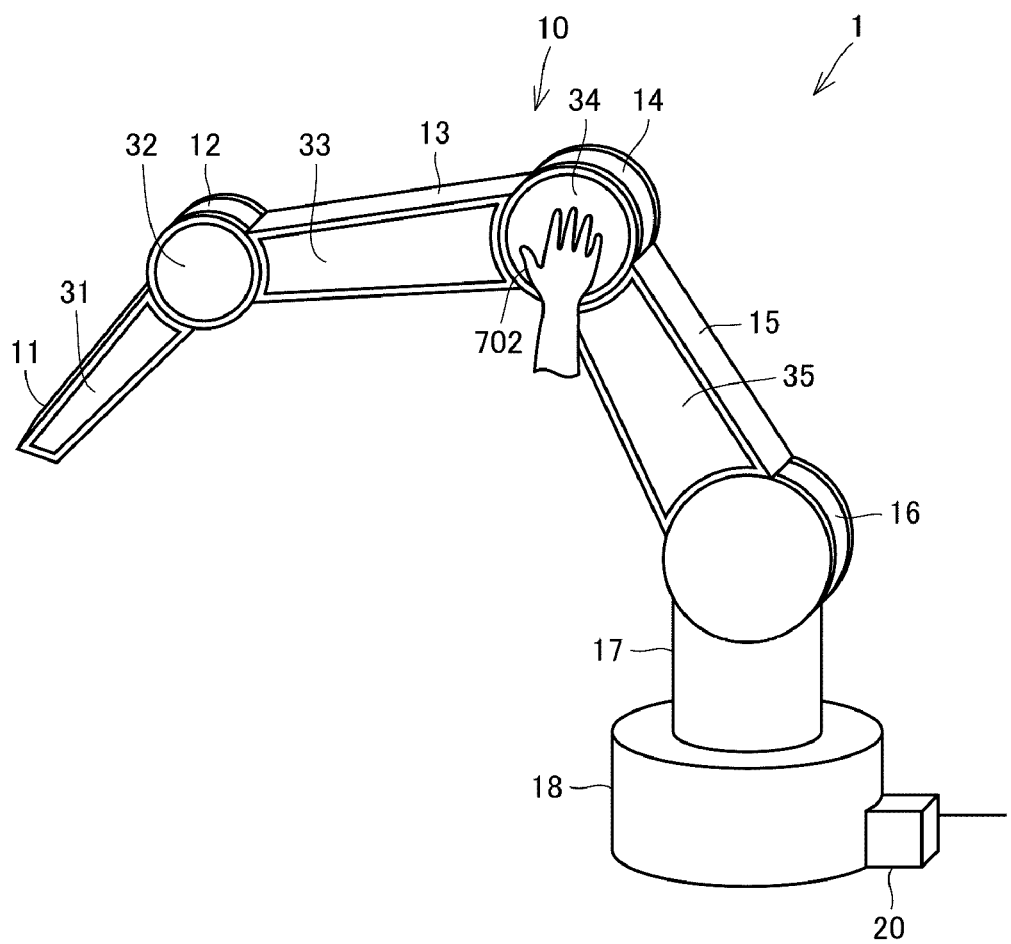
FIG. 4 is a view for describing a second example of a gesture input.

FIG. 4 is a view for describing a second example of a gesture input. As illustrated in FIG. 4, when the user double-taps the sensor device 34 with the right hand 702 (or the left hand 701), the controller 20 restarts the industrial robot 1.

(3) Third Example

Figure 5:
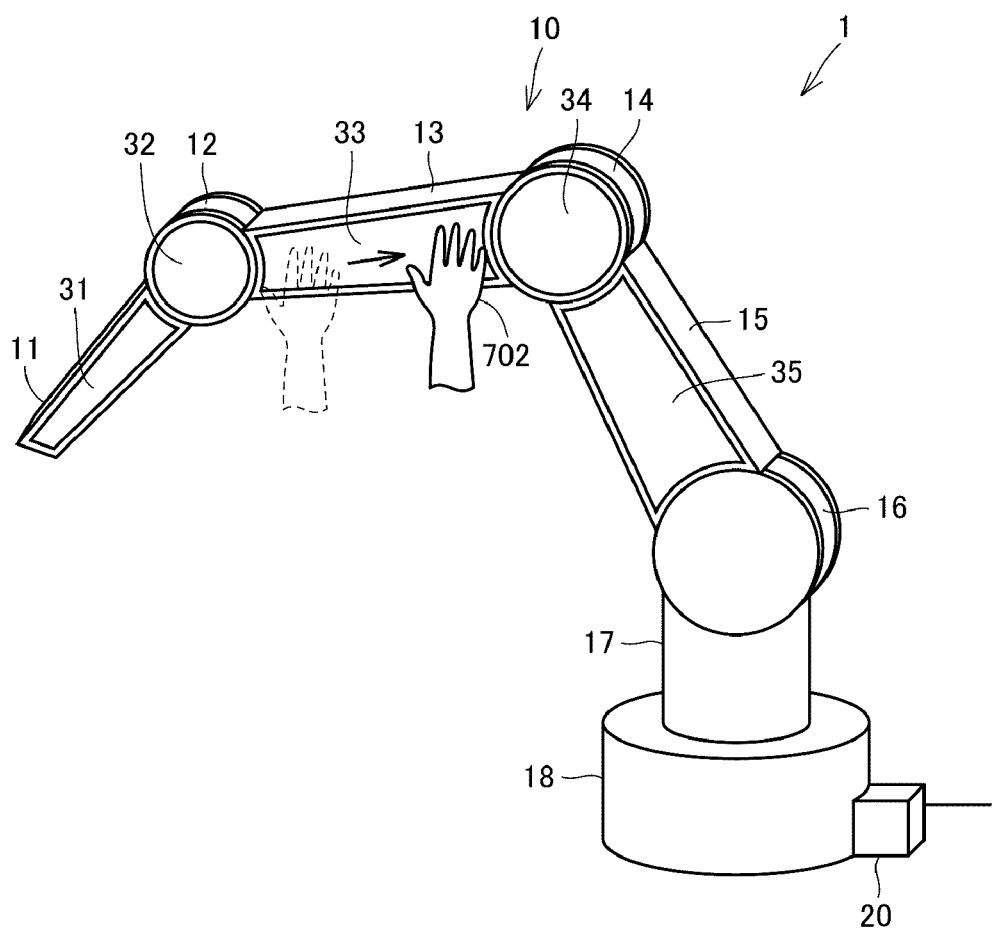
FIG. 5 is a view for describing a third example of a gesture input.

FIG. 5 is a view for describing a third example of a gesture input. As illustrated in FIG. 5, when the user performs a swipe operation on the sensor device 33 with the right hand 702 (or the left hand 701) in a direction from the joint 12 to the joint 14, the controller 20 returns a posture of the manipulator 10 to a default posture (returns it to its initial point). Further, a direction of the swipe is not limited to the direction from the joint 12 to the joint 14, and may also be a direction from the joint 14 to the joint 12.

(4) Fourth Example

Figure 6:
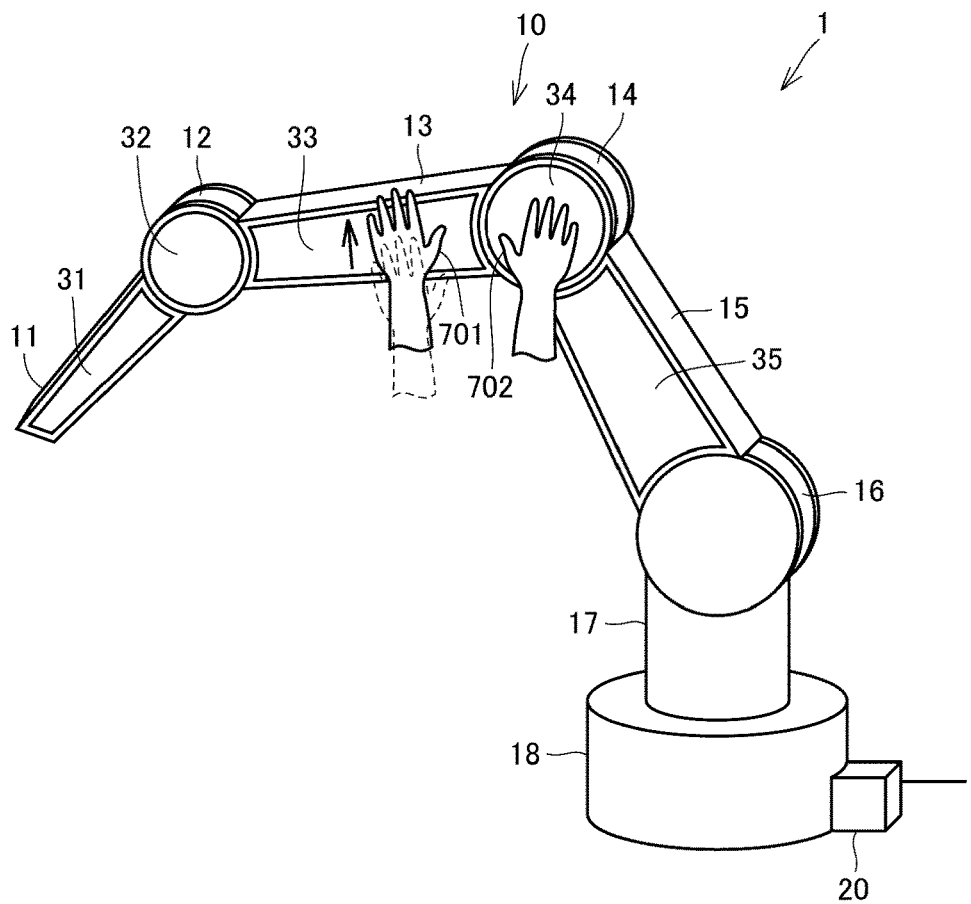
FIG. 6 is a view for describing a fourth example of a gesture input.

FIG. 6 is a view for describing a fourth example of a gesture input. As illustrated in FIG. 6, when the user performs a swipe operation on the sensor device 33 from a lower side to an upper side with the left hand 701 in a state in which the right hand 702 is touching the sensor device 34, the controller 20 switches an operation mode (operation).

As the operation mode, the controller 20 causes the manipulator 10 to repeatedly execute a selected operation among a plurality of operations (a series of operations). When the above-described user operation is performed, the controller 20 switches the operation mode from a current operation mode to a next operation mode. For example, when the current operation mode is a first mode in which the manipulator 10 repeatedly executes a first operation, the controller 20 switches the operation mode from the first mode to a second mode in which the manipulator 10 repeatedly executes a second operation.

Further, the controller 20 may be configured such that the operation mode is switched from the current operation mode to a previous operation mode when the direction of swipe is from the upper side to the lower side.

A relationship between the user's gesture input and the process performed based on the gesture input is not limited to the above-described relationships. It is preferable to configure the controller 20 such that the user can set what kind of process is executed for an input gesture. That is, it is preferable that the controller 20 be configured to receive a new registration of a gesture for executing a specific process or receive a renewal of a registration.

C. Speed Control and Sensitivity Setting

Since the industrial robot 1 is a cooperative robot, speed control in accordance with a distance to the worker is performed in consideration of safety of the worker.

Figure 7:
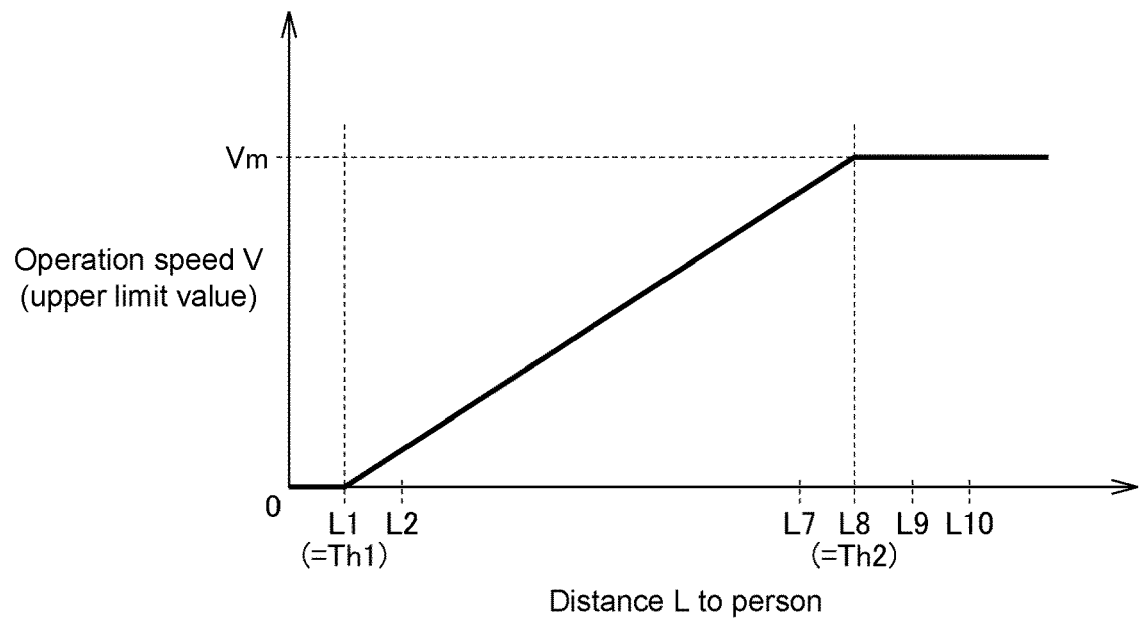
FIG. 7 is a view for describing an example of speed control of a manipulator.

FIG. 7 is a view for describing an example of speed control of the manipulator 10. A speed of the manipulator 10 in the present example refers to an operation speed (movement speed) of a distal end portion of the arm 11 to which an end-effector is attached.

Referring to FIG. 7, the controller 20 limits speeds of the joints 12, 14, and 16, and the pivot portion 17 so that an operation speed V of the manipulator 10 (specifically, detection device 30) becomes lower as a distance L between the manipulator 10 and the user becomes shorter. Specifically, the controller 20 limits an upper limit value of the speed.

When the distance L is longer than L8 (second threshold value), the operation speed V (upper limit value) is constant at Vm (fastest value). That is, the controller 20 controls operations of respective portions so that the manipulator 10 operates at a high speed (specifically, the distal end portion of the arm 11 operates at a high speed).

When the distance L is equal to or smaller than L1 (first threshold value) which is shorter than L8, the controller 20 stops the operation of the manipulator 10. When the manipulator 10 is stopped, the user can make various types of touch input based on FIGS. 3 to 6. The distances L2, L7, L9, and L10 will be described below.

Figure 8:
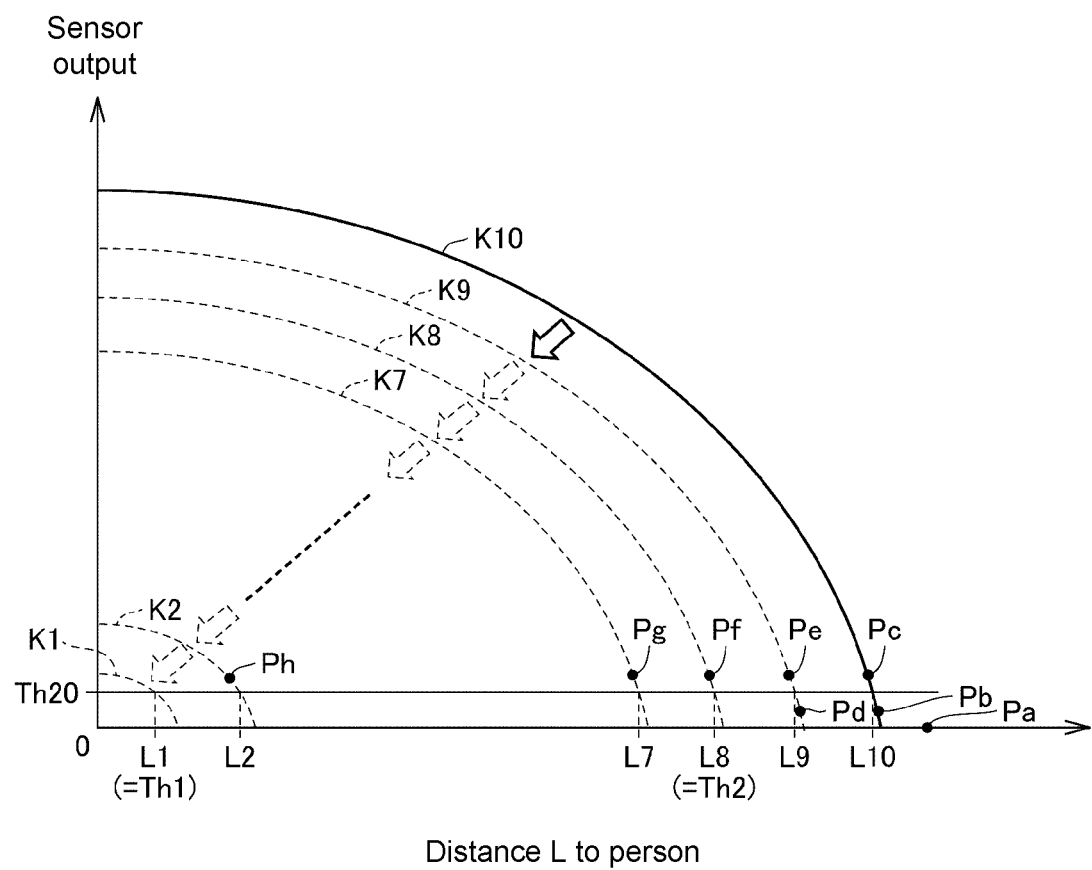
FIG. 8 is a view for describing sensitivity setting of a detection device.

FIG. 8 is a view for describing sensitivity setting of the detection device 30. Referring to FIG. 8, a sensor sensitivity (set sensitivity) of the detection device 30 is configured to become lower as the distance L between the detection device 30 and the object (user) becomes smaller. The controller 20 measures the distance L by changing the sensor sensitivity.

The sensor sensitivity is defined as a function of the distance L and a sensor output. The smaller a value of the distance L is, the larger a value of the sensor output becomes. In the present example, a sensitivity K10 is used as an initial value of the sensor sensitivity.

When the value of the distance L is sufficiently large, the sensor output is 0 (see point Pa). When the user comes closer to the industrial robot 1, a sensor output smaller than a threshold value Th20 can be obtained (see point Pb). When the user comes even closer to the industrial robot 1, the sensor output has a value larger than the threshold value Th20 (see point Pc). When the distance L is L10 (Pc<L10<Pb), the sensor output is the threshold value Th20.

When the sensor output exceeds the threshold value Th20, the controller 20 changes the sensor sensitivity from a current sensitivity to a sensitivity lower by one level than the current sensitivity level. In this case, the controller 20 changes the sensor sensitivity from the sensitivity K10 to a sensitivity K9. In a case of the sensitivity K10, when the sensor output exceeds the threshold value Th20, the controller 20 can determine that the user has come closer than the distance L10. In the sensitivity K9, when the distance L is L9 (L9<L10), the sensor output is the threshold value Th20.

When the user comes even closer to the industrial robot 1, a sensor output smaller than the threshold value Th20 can be obtained (see point Pd). When the user comes even closer to the industrial robot 1, the sensor output has a value larger than the threshold value Th20 (see point Pe). When the sensor output exceeds the threshold value Th20, the controller 20 changes the sensor sensitivity from the sensitivity K9 to a sensitivity K8. In this case, when the sensor output exceeds the threshold value Th20, the controller 20 can determine that the user has come closer than a distance L9. Further, in the sensitivity K8, when the distance L is L8 (L8<L9), the sensor output is the threshold value Th20.

Similarly, when the user comes even closer to the industrial robot 1, the sensor output has a value larger than the threshold value Th20 (see point Pf). When the sensor output exceeds the threshold value Th20, the controller 20 changes the sensor sensitivity from the sensitivity K8 to a sensitivity K7. Further, with the sensitivity K7, when the distance L is L7 (L7<L8), the sensor output is the threshold value Th20.

When the user comes even closer to the industrial robot 1, the sensor output has a value larger than the threshold value Th20 (see point Pg).

When the sensor sensitivity is equal to or less than the sensitivity K8 (that is, when the distance L is within L8), the controller 20 performs control such that a value of the operation speed V becomes smaller as the set sensor sensitivity becomes lower, and at the same sensitivity, the value of the operation speed V becomes smaller as the sensor output grows higher (see FIG. 7). Further, while the sensor sensitivity stays in a same sensitivity, the operation speed V may be constant irrespective of the sensor output.

After the sensor sensitivity is changed to a sensitivity K2, when the user comes even closer to the industrial robot 1 and thus the sensor output has a value larger than the threshold value Th 20 (refer to the point Ph), the controller 20 changes the sensor sensitivity from the sensitivity K2 to a sensitivity K1. When the sensor sensitivity is the sensitivity K1 (that is, when the distance L is within the L1), the controller 20 sets the operation speed V to zero as illustrated in FIG. 7. That is, the controller 20 stops the manipulator 10.

Incidentally, when the number of settable sensitivities increases, the distance L can be measured more accurately.

D. Functional Configuration

Figure 9:
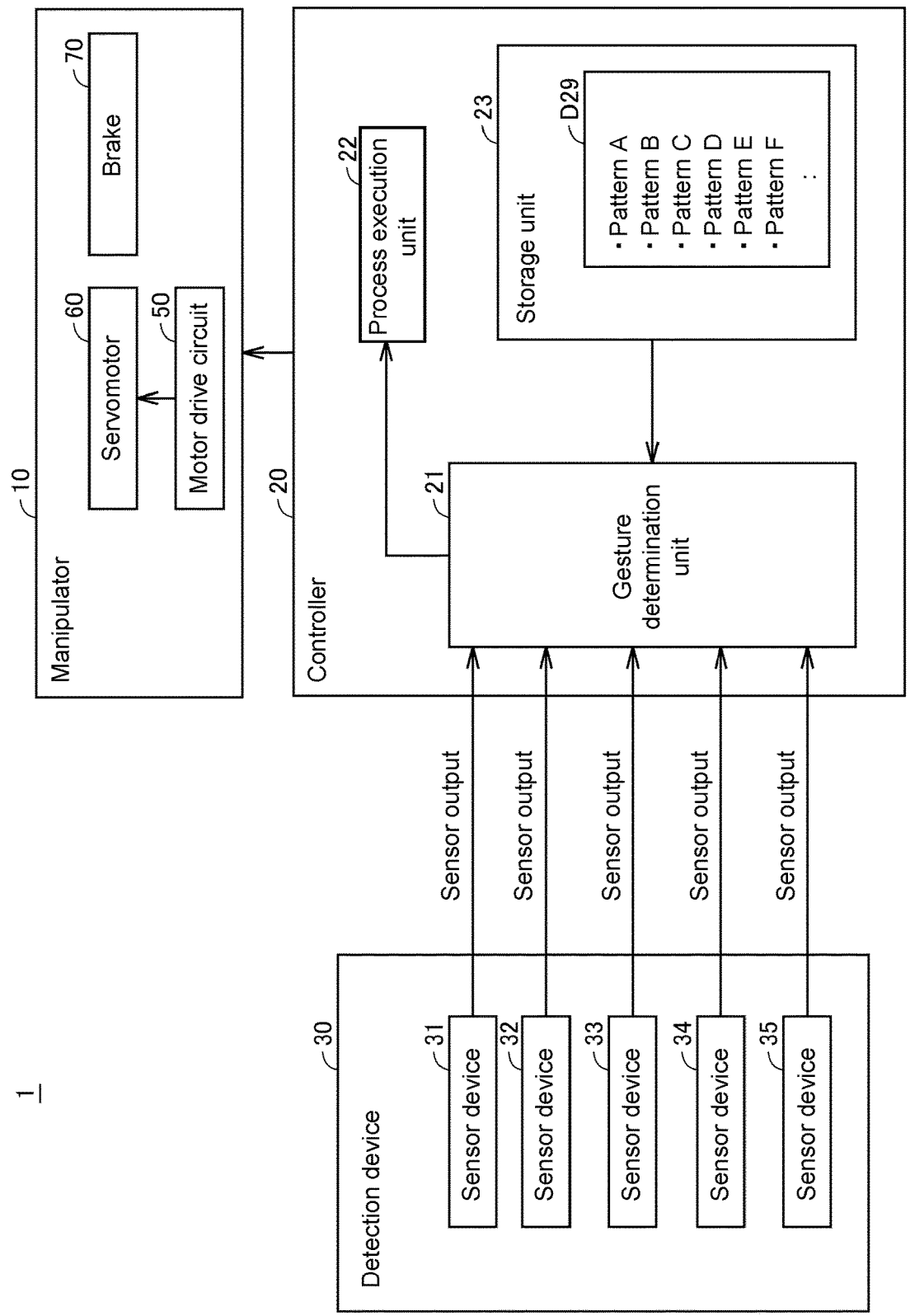
FIG. 9 is a view for describing a functional configuration of a controller of an industrial robot.

FIG. 9 is a view for primarily describing a functional configuration of the controller 20 of the industrial robot 1. Referring to FIG. 9, the industrial robot 1 includes the manipulator 10, the controller 20, and the detection device 30, as described above. As described above, the detection device 30 is configured with a plurality of sensor devices 31 to 35.

The controller 20 includes a gesture determination unit 21, a process execution unit 22, and a storage unit 23. In the storage unit 23, data D29 of a plurality of stored predetermined patterns is stored.

The manipulator 10 includes a motor drive circuit 50, a servomotor 60, and a brake 70 in addition to the arms 11, 13, and 15, and the joints 12, 14, and 16. The motor drive circuit 50, the servomotor 60, and the brake 70 are provided in each of the joints 12, 14, and 16, and the pivot portion 17.

The motor drive circuit 50 drives the servomotor 60 on the basis of a command from the controller 20. The brake 70 is a brake for holding the joints and the pivot portion 17. In a state in which the brake 70 is applied, an angle (joint angle) formed by two adjacent arms or a rotation angle of the pivot portion 17 is held constant. When the brake 70 is released, an auxiliary torque can be used to move an arm to a desired position by hand.

The sensor output from each of the sensor devices 31 to 35 is input to the controller 20. The gesture determination unit 21 of the controller 20 processes the sensor output as the gesture input. The gesture determination unit 21 determines which of the patterns stored in the data D29 corresponds to (coincide with) the gesture input.

When correspondence with any one of the patterns is determined, the gesture determination unit 21 causes the process execution unit 22 to execute a process corresponding to the pattern. When the gesture determination unit 21 does not determine correspondence with any one of the patterns, a process corresponding to the gesture is not executed.

Further, when correspondence with any one of the patterns is determined, the controller 20 causes a notification device (not illustrated) to execute a predetermined notification process. For example, the controller 20 outputs a predetermined notification sound from a speaker.

FIG. 10 is a view showing an overview of the data D29 stored in the storage unit 23. The data D29 shown in FIG. 10 is an example, and a content and a format are not limited thereto.

Referring to FIG. 10, a plurality of patterns A, B, C, D, E, F, G, H, . . . are stored in the data D29 in advance. In each pattern, a process, a detected content (gesture), and details of the process are stored in association with each other.

As described with reference to FIG. 3, the pattern A is the pattern for performing direct teaching related to the teaching point (the first example). As described with reference to FIG. 4, the pattern B is the pattern for restarting the industrial robot 1 (the second example). As described with reference to FIG. 5, the pattern C is the pattern for returning the posture of the manipulator 10 to the default posture (the third example). As described with reference to FIG. 6, the pattern D is a pattern for switching the operation mode (operation) (the fourth example).

The pattern for changing the auxiliary torque, the pattern for performing direct teaching related to the movement speed, the pattern for performing setting of the safety distance (typically, the distance L8 illustrated in FIG. 7), and the pattern for transitioning to a normal operation, are respectively stored as the patterns E, F, G, and H.

When it is determined that the gesture input corresponds to the pattern E, the controller 20 changes the auxiliary torque at the time of a direct teaching operation. For example, the controller 20 increases or decreases the auxiliary torque by a fixed value. Alternatively, when a distance due to the gesture input (distance between the start point and the end point) can be obtained as in a swipe operation, the increase/decrease value of the auxiliary torque may be changed according to the distance.

E. Control Structure

Figure 11:
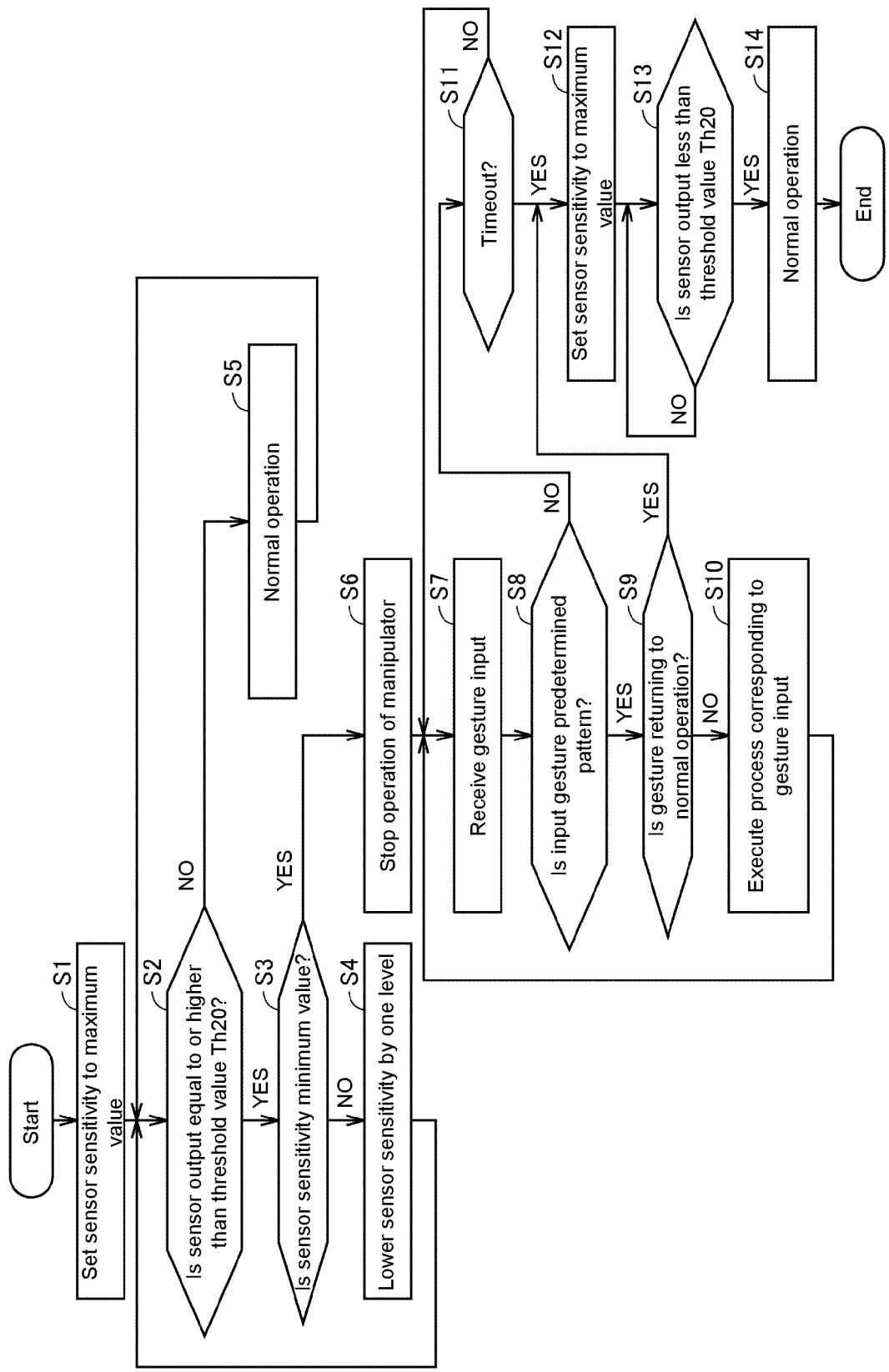
FIG. 11 is a flowchart for describing a flow of typical processes in a controller.

FIG. 11 is a flowchart for describing a flow of typical processes in the controller 20.

Referring to FIG. 11, in step S1, the controller 20 sets the sensor sensitivity to a maximum value. In the example of FIG. 8, the controller 20 sets the sensor sensitivity to the sensitivity K10. In step S2, the controller 20 determines whether or not the sensor output is equal to or higher than the threshold value Th20.

When it is determined that the sensor output is equal to or higher than the threshold value Th20 (YES in step S2), the controller 20 proceeds to step S3. When it is determined that the sensor output is not equal to or higher than the threshold value Th20 (NO in step S2), the controller 20 causes the manipulator 10 to execute the normal operation in step S5. The normal operation refers to a state in which the operation speed V (upper limit value) is set to Vm (fastest value). In this case, the arms 11, 13, and 15 operate at a high speed according to the program.

In step S3, the controller 20 determines whether or not the sensor sensitivity is a minimum value (sensitivity K1 in the example of FIG. 8). When it is determined that the sensor sensitivity is not the minimum value (NO in step S3), the controller 20 lowers the sensor sensitivity by one level in step S4. When it is determined that the sensor sensitivity is the minimum value (YES in step S3), the controller 20 stops the operation of the manipulator 10 (typically the operation of the arms 11, 13, and 15) in step S6.

In step S7, the controller 20 receives the gesture input via the detection device 30. In step S8, the controller 20 determines whether or not the received gesture input is a predetermined pattern stored in the data D29.

When it is determined that the pattern is a predetermined pattern (YES in step S8), on condition that it is not a gesture returning to the normal operation (NO in step S9), the controller 20 causes the process execution unit 22 to execute a process corresponding to the gesture input in step S10. When it is determined that the pattern is a predetermined pattern (YES in step S8), the controller 20 proceeds to step S12 on condition that the gesture returns to the normal operation (YES in step S9).

When it is determined that the pattern is not a predetermined pattern (NO in step S8), in step S11, the controller 20 determines whether or not a predetermined time has elapsed since the gesture input was received in step S7 (whether timeout has occurred or not). When it is determined that timeout has not occurred (NO in step S11), the controller 20 waits for another gesture input in step S7. When it is determined that timeout has occurred (YES in step S11), the controller 20 returns the sensor sensitivity to the maximum value in step S12.

In step S13, the controller 20 determines whether or not the sensor output is less than the threshold value Th20. The controller 20 switches the operation of the manipulator 10 from a stopped state to the normal operation in step S14 on condition that the sensor output is less than the threshold value Th 20 (YES in step S13). That is, on condition that the user has moved sufficiently away from the industrial robot 1, the controller 20 switches from the operation mode receiving the gesture input to the mode of normal operation.

F. Summary (1) The industrial robot 1 includes the manipulator 10, the controller 20 which controls the operation of the manipulator 10, and the detection device 30 attached to the manipulator 10 and detecting a gesture input. The controller 20 executes a process corresponding to the detected gesture input.

According to this configuration, by performing the gesture input, the user can cause the industrial robot 1 to execute a process corresponding to the gesture input. Therefore, according to the industrial robot 1, operability can be improved as compared with an industrial robot which cannot receive a gesture input.

(2) The detection device 30 is further used for measuring the distance L between the manipulator 10 and an object. When the measured distance L is a second distance shorter than a first distance (for example, distance L8), the controller 20 decreases the operation speed of the manipulator 10 compared with a case of it being the first distance (see FIG. 7). According to this configuration, it is possible to use the detection device 30 as a safety sensor.

(3) When the distance L is shorter than a predetermined threshold value Th2 (distance L8), the controller 20 lowers the sensor sensitivity (detection sensitivity) of the detection device 30 compared with when the distance L is longer than the threshold value Th2. According to this configuration, it is possible to detect that the user is coming closer.

(4) The controller 20 receives a direct teaching operation with respect to the industrial robot 1 as a process corresponding to a gesture input on condition that the gesture input is an input of a predetermined pattern. According to this configuration, the user can perform direct teaching by performing a predetermined gesture input.

(5) The controller 20 changes the auxiliary torque at the time of a direct teaching operation with respect to the industrial robot 1 as a process corresponding to a gesture input on condition that the gesture input is an input of a predetermined pattern. According to this configuration, the user can change the auxiliary torque at the time of a direct teaching operation by performing a predetermined gesture input.

(6) The controller 20 restarts the industrial robot 1 as a process corresponding to a gesture input on condition that the gesture input is an input of a predetermined pattern. According to this configuration, the user can restart the industrial robot 1 by performing a predetermined gesture input.

(7) The controller 20 returns the posture of the manipulator 10 to the default posture as a process corresponding to a gesture input on condition that the gesture input is an input of a predetermined pattern. According to this configuration, the user can return the posture of the manipulator 10 to the default posture by performing a predetermined gesture input.

(8) As operation modes, the controller 20 includes a first mode in which the manipulator 10 repeatedly executes a first operation and a second mode in which the manipulator 10 repeatedly executes a second operation. When the operation mode is the first mode, the controller 20 switches the operation mode from the first mode to the second mode as a process corresponding to a gesture input on condition that the gesture input is an input of a predetermined pattern. According to this configuration, the user can change the operation mode by performing the predetermined gesture input.

(9) The detection device 30 is attached to the arms 11, 13, and 15, and the joints 12 and 14. The detection device 30 does not necessarily need to be attached to all the arms. Also, the detection device 30 need not be attached to the two joints 12 and 14. The detection device 30 may be attached to at least one of the arms 11, 13, and 15 and the joints 12 and 14.

(10) The controller 20 executes a process corresponding to a combination of a gesture input to the first arm, a gesture input to the second arm, and a gesture input to the joint 12 or the joint 14. The first arm and the second arm are any one of the arms 11, 13, and 15.

(11) The industrial robot 1 executes the predetermined notification process on condition that a gesture input is an input of a predetermined pattern. According to this configuration, the user can ascertain that the gesture input has been received.

(12) The detection device 30 is a sensor array including a plurality of proximity sensors 351.

G. Modified Example (1) In the above description, as described with reference to FIG. 8, the controller 20 can measure the distance L between the manipulator 10 and the user by changing the sensor sensitivity. However, measurement of the distance L is not limited thereto.

Figure 12:
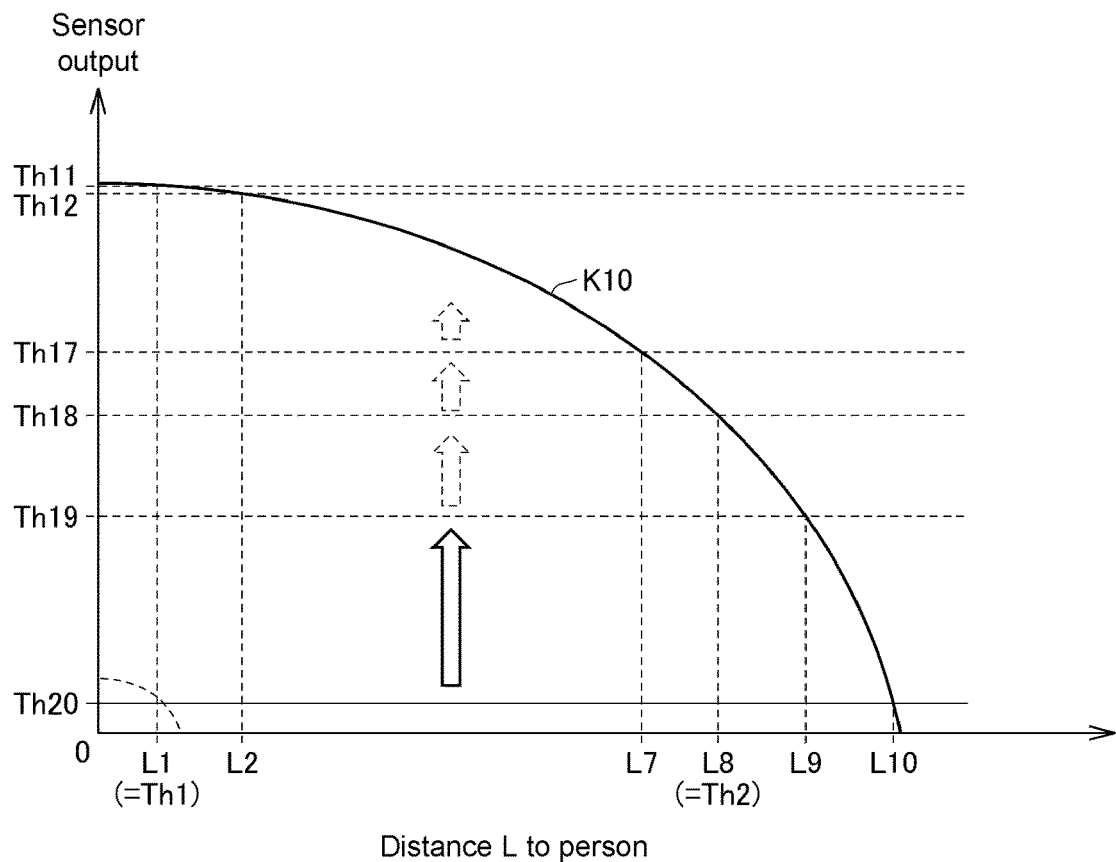
FIG. 12 is a view for describing a method of measuring a distance when a sensor sensitivity is set to be constant.

FIG. 12 is a view for describing a method of measuring the distance L when the sensor sensitivity (set sensitivity) is set to be constant. Referring to FIG. 12, when the sensor output exceeds the threshold value Th20, the controller 20 changes the threshold value to a threshold Th19 which is higher than the threshold value Th20. Thereafter, when the user comes even closer to the manipulator 10 and thus the sensor output exceeds the threshold Th19, the controller 20 changes the threshold value to a threshold value Th18 which is higher than the threshold value Th19. Thereafter, when the user comes even closer to the manipulator 10 and thus the sensor output exceeds the threshold Th18, the controller 20 changes the threshold value to a threshold value Th17 which is higher than the threshold value Th18. Thereafter, the controller 20 repeats such a threshold value changing process. When the threshold value is set to be equal to or higher than the threshold value Th18, the controller 20 performs control such that the value of the operation speed V of the manipulator 10 becomes smaller as the sensor output grows higher (see FIG. 7).

When the sensor output exceeds a threshold value Th12, the controller 20 changes the threshold value to a threshold Th11 which is higher than the threshold value Th12. The controller 20 stops the operation of the manipulator 10 on the basis of the threshold value changing to the threshold value Th11.

Even with such a configuration, it is possible to obtain the same effect as in the case of changing the sensor sensitivity.

Figure 13:
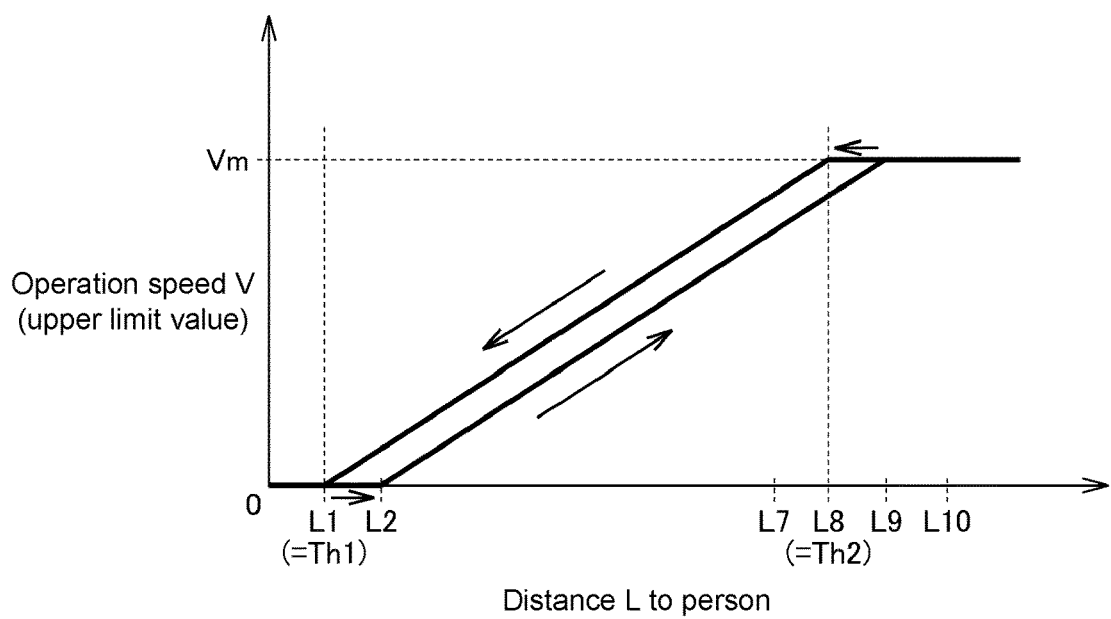
FIG. 13 is a view for describing another example of speed control of the manipulator.

(2) FIG. 13 is a view for describing another example of speed control of the manipulator 10. Referring to FIG. 13, when the user comes closer to the manipulator 10, the controller 20 performs the same speed control as in FIG. 7. On the other hand, when the user moves away from the manipulator 10, the controller 20 lengthens the distance at which the operation speed V is zero. With such a configuration, it is possible to operate the manipulator 10 on condition that the user is further away than the distance L1.

Typically, the controller 20 reduces the value of the operating speed V at the same distance L than when the user comes closer to the manipulator 10. With such a configuration, the user can feel that the manipulator 10 is slowly moving away.

(3) In the above description, the detection device 30 is configured with proximity sensors. However, the disclosure is not limited thereto, and the detection device 30 may be configured with push switches or pressure sensors.

Further, the detection device 30 may be configured with a device for measuring the distance L (for example, a distance measuring device with a laser) and a device for detecting the gesture input (for example, a touch pad).

(4) The above-described control is not limited to the control for a cooperative robot, and can be applied to various types of industrial robot.

The disclosure provides an industrial robot having high operability for a user, a controller for controlling the industrial robot, and a method in the controller.

According to an aspect of the disclosure, an industrial robot includes a manipulator, a controller which controls an operation of the manipulator, and a detection device attached to the manipulator and configured to detect a gesture input. The controller executes a process corresponding to the detected gesture input.

Preferably, the detection device is further used for measuring a distance between the manipulator and an object. The controller may decrease an operation speed of the manipulator compared with a case of it being the first distance when the measured distance is a second distance which is shorter than a first distance.

Preferably, when the distance is shorter than a predetermined threshold value, the controller lowers a sensor sensitivity of the detection device compared with that when the distance is longer than the threshold value.

Preferably, the controller receives a direct teaching operation with respect to the industrial robot as a process corresponding to the gesture input on condition that the gesture input is an input of a predetermined pattern.

Preferably, the controller changes an auxiliary torque at the time of a direct teaching operation with respect to the industrial robot as a process corresponding to the gesture input on condition that the gesture input is an input of a predetermined pattern.

Preferably, the controller restarts the industrial robot as a process corresponding to the gesture input on condition that the gesture input is an input of a predetermined pattern.

Preferably, the controller returns a posture of the manipulator to a default posture as a process corresponding to the gesture input on condition that the gesture input is an input of a predetermined pattern.

Preferably, as operation modes, the controller includes a first mode in which the manipulator repeatedly executes a first operation and a second mode in which the manipulator repeatedly executes a second operation. When the operation mode is the first mode, the controller may switch the operation mode from the first mode to the second mode as a process corresponding to the gesture input on condition that the gesture input is an input of a predetermined pattern.

Preferably, the manipulator includes an arm. The detection device may be attached to the arm.

Preferably, the manipulator includes a first arm, a second arm, and a joint which moves the second arm with respect to the first arm. The detection device may be attached to the joint.

Preferably, the manipulator includes a first arm, a second arm, and a joint which moves the second arm with respect to the first arm. The detection device may be attached to at least one arm of the first arm and the second arm and to the joint.

Preferably, the detection device is attached to the first arm and the second arm. The controller may execute a process corresponding to a combination of a gesture input to the first arm, a gesture input to the second arm, and a gesture input to the joint.

Preferably, the industrial robot executes a predetermined notification process on condition that the gesture input is an input of a predetermined pattern.

Preferably, the detection device is a sensor array including a plurality of proximity sensors.

Preferably, the detection device is a push switch or a pressure sensor.

According to another aspect of the disclosure, a controller controls an operation of a manipulator of an industrial robot. The controller includes a determination unit of determining a pattern of a gesture input to the industrial robot on the basis of an output from a detection device attached to the manipulator, and an execution unit of executing a process corresponding to the detected pattern.

According to yet another aspect of the disclosure, a method is executed in a controller which controls an operation of a manipulator of an industrial robot. The method includes a step of determining a pattern of a gesture input to the industrial robot on the basis of an output from a detection device attached to the manipulator, and a step of executing a process corresponding to the detected pattern.

According to the disclosure, operability of the industrial robot can be improved.

It should be considered that embodiments disclosed herein are illustrative only in all respects, and are not restrictive. The scope of the disclosure is defined not by the description of the embodiment described above but by the claims and is intended to include meanings equivalent to the claims and all modifications within the scope.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An industrial robot comprising:
a manipulator;
a controller which controls an operation of the manipulator; and
a detection device attached to the manipulator and configured to detect a gesture input, wherein the detection device comprises a sensor or a switch,
the controller executes a process corresponding to the detected gesture input,
the detection device is further used for measuring a distance between the manipulator and an object,
the controller decreases an operation speed of the manipulator compared with a case of the distance being a first distance when the measured distance is a second distance which is shorter than the first distance,
the controller further decreases the operation speed of the manipulator to zero when the distance between the manipulator and the object is smaller than a predetermined distance, and
the controller further lengthens the predetermined distance at which the operation speed is zero when the object moves away from the manipulator.

2. The industrial robot according to claim 1, wherein, when the distance is shorter than a predetermined threshold value, the controller lowers a sensor sensitivity of the detection device compared with that when the distance is longer than the threshold value.

3. The industrial robot according to claim 2, wherein the controller receives a direct teaching operation with respect to the industrial robot as a process corresponding to the gesture input on condition that the gesture input is an input of a predetermined pattern.

4. The industrial robot according to claim 1, wherein the controller receives a direct teaching operation with respect to the industrial robot as a process corresponding to the gesture input on condition that the gesture input is an input of a predetermined pattern.

5. The industrial robot according to claim 1, wherein the controller changes an auxiliary torque at a time of a direct teaching operation with respect to the industrial robot as a process corresponding to the gesture input on condition that the gesture input is an input of a predetermined pattern.

6. The industrial robot according to claim 1, wherein the controller restarts the industrial robot as a process corresponding to the gesture input on condition that the gesture input is an input of a predetermined pattern.

7. The industrial robot according to claim 1, wherein the controller returns a posture of the manipulator to a default posture as a process corresponding to the gesture input on condition that the gesture input is an input of a predetermined pattern.

8. The industrial robot according to claim 1, wherein:
the controller includes, as operation modes,:
a first mode in which the manipulator repeatedly executes a first operation; and
a second mode in which the manipulator repeatedly executes a second operation, and
the controller switches, when the operation mode is the first mode, the operation mode from the first mode to the second mode as a process corresponding to the gesture input on condition that the gesture input is an input of a predetermined pattern.

9. The industrial robot according to claim 1, wherein:
the manipulator includes an arm; and
the detection device is attached to the arm.

10. The industrial robot according to claim 1, wherein:
the manipulator includes a first arm, a second arm, and a joint which moves the second arm with respect to the first arm; and
the detection device is attached to the joint.

11. The industrial robot according to claim 1, wherein:
the manipulator includes a first arm, a second arm, and a joint which moves the second arm with respect to the first arm; and
the detection device is attached to at least one arm of the first arm and the second arm and to the joint.

12. The industrial robot according to claim 11, wherein:
the detection device is attached to the first arm and the second arm; and
the controller executes a process corresponding to a combination of a gesture input to the first arm, another gesture input to the second arm, and further another gesture input to the joint.

13. The industrial robot according to claim 1, wherein a predetermined notification process is executed on condition that the gesture input is an input of a predetermined pattern.

14. The industrial robot according to claim 1, wherein the detection device is a sensor array including a plurality of proximity sensors.

15. The industrial robot according to claim 1, wherein the detection device is a push switch or a pressure sensor.

16. The industrial robot according to claim 1, wherein the controller comprising:
processor of determining a pattern of a gesture input to the industrial robot on the basis of an output from the detection device attached to the manipulator and
executing a process corresponding to the pattern which has been detected.

17. A method in a controller controlling an operation of a manipulator of an industrial robot, the method comprising:
a step of determining a pattern of a gesture input to the industrial robot on the basis of an output from a detection device attached to the manipulator, wherein the detection device comprises a sensor or a switch and is used for measuring a distance between the manipulator and an object;
a step of executing a process corresponding to the pattern which has been detected;
a step of decreasing an operation speed of the manipulator compared with a case of the distance being a first distance when the measured distance is a second distance which is shorter than the first distance;
a step of decreasing the operation speed of the manipulator to zero when the distance between the manipulator and the object is smaller than a predetermined distance; and
a step of lengthening the predetermined distance at which the operation speed is zero when the object moves away from the manipulator.

* * * * *